April 28, 1925.
C. H. LOVELL
SCOOTER
Filed Oct. 2, 1922
1,535,167
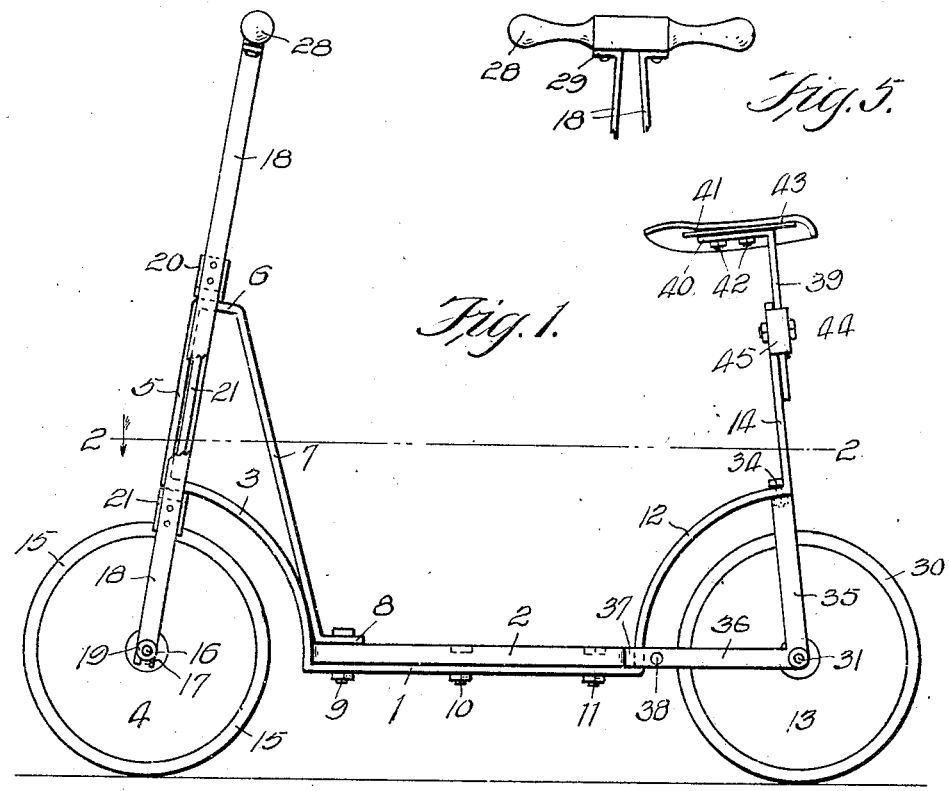
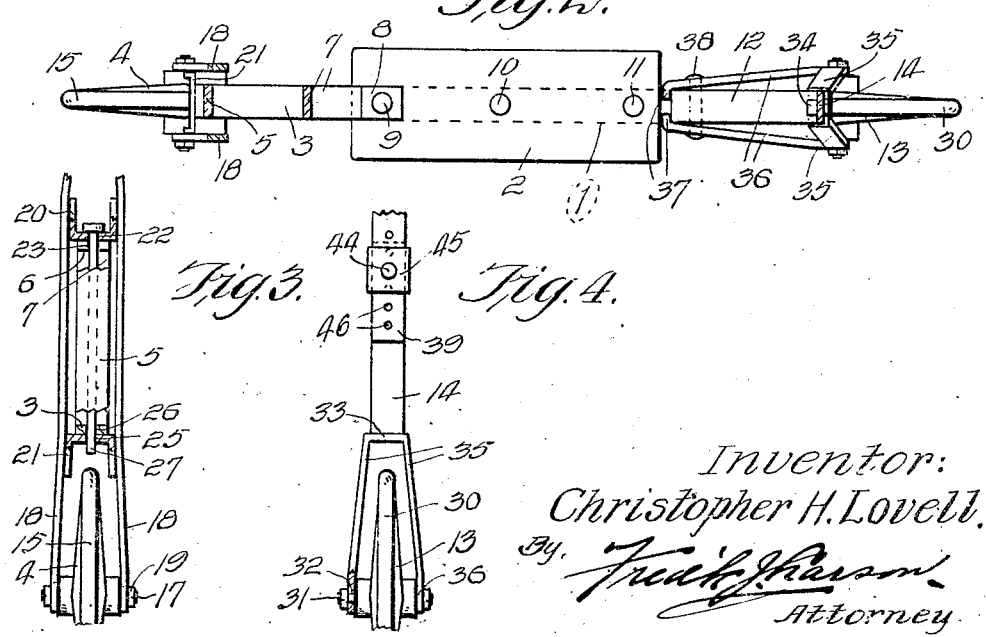
Inventor:
Christopher H. Lovell.
By Fred'k J. Hansen
Attorney Patented Apr. 28, 1925.

1,535,167

UNITED STATES PATENT OFFICE.

CHRISTOPHER H. LOVELL, OF ST. LOUIS, MISSOURI.

SCOOTER.

Application filed October 2, 1922. Serial No. 591,827.

*To all whom it may concern:*

Be it known that I, CHRISTOPHER H. LOVELL, a citizen of the United States, residing in the city of St. Louis and State of Missouri, have invented a certain new and useful Improvement in Scooters, of which the following is a specification.

My invention relates to vehicles, and, more particularly to two-wheel supported vehicles, commonly known, especially to children, as scooters, coasters and gliders upon which children can ride, the propulsion of the device being accomplished upon level surfaces, or upgrades, by one foot of the rider coming in contact with a traction surface for pushing the device along. Downgrade the scooter travels by its own momentum.

The invention is a distinct and practical improvement to overcome certain practical objections to, and defects in, scooters of universal construction.

The object of my present invention is to provide a scooter consisting of a substantially one-piece main supporting frame formed at its forward and rear ends to serve as wheel guards to the front and rear wheels, respectively.

A further object of the invention is to provide means for the support of a rider's seat adjacent the rear wheel of the vehicle.

A still further object of the invention is to provide the device with novel steering means.

With the above and other objects in view, the invention consists of the novel features of construction, arrangement and combination of parts hereinafter more fully described and finally pointed out in the claims hereto appended.

Referring to the accompanying drawings forming a part of this specification, wherein like characters of reference denote similar parts throughout the several views:

Fig. 1, is a side elevation of a scooter embodying the features of my invention.

Fig. 2, is a sectional view, taken on line 2—2 of Fig. 1, looking in direction of the arrow.

Fig. 3, is a front elevation of the device with portions thereof broken away.

Fig. 4, is a rear elevation of the device with portions thereof broken away.

Fig. 5, is a detail of the steering handle, showing the forked connection, as partly broken away.

Referring to the drawings, the main supporting frame of the device consists of a single metallic strap formed to provide a horizontally disposed central suspended section 1 for the support of a running board, or floor member 2. The forward end of the running board supporting section 1 of the single member frame is curved upwardly and forwardly to serve as a wheel guard 3 for the front support 4. The forward end of the front wheel guard section 3 of frame is directed upwardly a suitable distance and also preferably rearwardly to form an inclined front section 5 to the frame. The upper end of the inclined front section 5 is bent and directed rearwardly at a right angle to the inclined front section of the frame to serve as a bearing section 6. The rear end of the bearing section 6 is bent and directed downwardly at an acute angle to the bearing section 6 to provide a front brace section 7, which section terminates in a foot section 8 for contact with the upper surface of the running board 2. The foot 8 is fixed to the forward end of the running board 2 by means of a suitable fastening device 9, which device passes through the foot 8, board 2 and section 1 of the frame for firmly and rigidly uniting said parts as a unit. The board 2 is further fixed to the frame section 1 by means of the suitable fastening devices 10 and 11, which are positioned centrally of the board and to the rear end thereof, respectively. The central fastener 10 prevents any possible bowing of the board supporting section 1, whereas elimination thereof permits bowing thereof under a load. The rear end of the running board supporting section 1 is curved upwardly and rearwardly to serve as a mud guard section 12 to the rear supporting wheel 13. The rear end of the mud guard section 9 terminates in an upwardly and forwardly directed supporting post 14 which may be any desired height.

The front supporting wheel 4, which is preferably provided with a rubber tire 15, is also provided with an axle 16 which is received at its extended ends in the open end slots 17 formed at the lower ends of the opposed steering form strap member 18. The axle is fixed against rotation with relation to the fork members by means of the nuts 19 which have screw threaded engagement with the ends of the axle 16 and further frictionally engage the outer faces of the fork members 18. The steering fork strap members 18 are united in suitable spaced relation by means of the two spaced, preferably U-shaped bearing members 20 and 21, which are suitably fixed thereto. The upper bearing member 20 is provided with an opening 22 which registers with an opening 23 in the bearing section 6 of the main frame. The lower bearing member 21 is provided with an opening 25 which registers with an opening 26 in the forward end of the front mud guard section 3 of the supporting frame. A suitable pivot pin 27 is receivable in the aforesaid registered openings 22 and 23, and 25 and 26, to serve as a pivot member for the steering mechanism of the vehicle. A suitable steering handle 28 is suitably fixed to the upper angular ends 29 of the steering fork members 18.

The rear supporting wheel 13, which is preferably provided with a rubber tire 30, is also provided with an axle 31 which is received at its extended ends in the openings 32 of a rear brace frame consisting of a single metallic strap member. This strap member is provided with a central section 33 which is fixed to the rear end of the rear mud guard 12 by means of a suitable fastening device 34. The ends of the central section 33 are bent and directed downwardly in opposed relation to provide the upright connecting brace arms 35 which arms are in turn bent at an acute angle to provide the horizontally disposed connecting brace arms 36 which arms 36 finally terminate in the opposed inwardly directed fingers 37 adapted to be positioned upon the central section 1 of the supporting frame and disposed between the rear end of the running board 2 and the lower end of the rear mud guard section 12 of the supporting frame. The free forward ends of the connecting brace arm sections 36 are tied together by means of a suitable fastening device 38 positioned to the rear of the lower end of the rear mud guard section 12 of the supporting frame. The arm sections 35 and 36 of the rear brace member being disposed at an acute angle causes the arms 35 to be directed in a slight forward incline and in alignment with the supporting post 14 of the supporting frame.

A seat post 39 is adjustably supported by the supporting post 14 of the supporting frame. The upper end 40 of the seat post 39 is bent forwardly to serve as a support for a plate 41 which plate is secured to the arm 40 of the post by suitable fastening devices 42. A suitable fibrous or other seat 43 is suitably fixed to the plate 41 upon which the rider can be seated when desired. The seat post 39 is adjustable up and down through the medium of a suitable fastening device 44 and a U-shaped guide plate 45 mounted upon the fastener, which prevents rotary movement of the post 39 upon the fastener 44 owing to the fact that the sides of the plate engage the side faces of post 14. The post 39 is provided with a plurality of fastener receiving openings 46, any one of which can be adjusted to register with an opening in the post 14 for the reception of the fastener 44, as is manifest.

The many advantages of the herein described invention will readily suggest themselves to those skilled in the art to which it appertains.

I do not desire to be understood as limiting myself to the exact details of construction and arrangement of parts as herein described and illustrated, as it is manifest that variations and modifications may be made without departing from the spirit and scope of my invention and the terms of the following claims, hence I wish it to be understood that I reserve the right to make any such changes, or modifications as may fairly fall within the scope of the appended claims when fairly construed.

What I claim is:

1. In a vehicle of the class described, a wheel supported frame consisting of a single strap iron member formed to provide a running board supporting section, front and rear wheel guard sections and a front wheel steering mechanism supporting section, and a separate connecting section between the rear wheel and the single member frame.

2. In a vehicle of the class described, a wheel supported frame consisting of a single strap iron member formed to provide a running board supporting section, front and rear wheel guard sections and a front wheel steering mechanism supporting section, a separate connecting section between the rear wheel and the single member frame, a supporting post as a termination of the rear wheel guard section and a seat supported thereby.

3. In a vehicle of the class described, a wheel supported frame consisting of a single strap iron member formed to provide a running board supporting section, front and rear wheel guard sections and a front wheel steering mechanism supporting section, a separate connecting section between the rear wheel and the single member frame, and a seat adjustably supported thereby.

4. In a vehicle of the class described, a wheel supported frame consisting of a single strap iron member formed to provide a central horizontally disposed suspended section, a front wheel guard section, a front bracing section and a rear wheel guard section, a steering mechanism supported by said front bracing section, and a rear wheel connecting section fixed to said rear wheel guard section.

5. In a vehicle of the class described, a wheel supported frame consisting of a single strap iron member formed to provide a central horizontally disposed suspended section, a front wheel guard section, a front bracing section, a rear wheel guard section and a seat supporting section, a steering mechanism supported by said front bracing section, a rear wheel connecting section fixed to said rear wheel guard section and a seat carried by said seat supporting section.

6. A scooter comprising a main frame formed from a single flat metallic band having curved front and rear ends, an angular connecting frame formed from a single flat metallic band fixed to the rear curved end of the main frame, a wheel carried by the angular connecting frame, a steering mechanism pivotally supported at the forward end of said main frame and a wheel carried by the steering mechanism.

7. A scooter comprising a main frame formed from a single flat metallic band having curved front and rear ends, a seat post forming a continuation of the main frame, a seat supported by said post, a frame formed from a single flat metallic band fixed to the rear curved end of the main frame, a wheel carried by said frame, a steering mechanism pivotally supported at the forward end of said main frame and a wheel carried by the steering mechanism.

In testimony whereof I have hereunto signed my name to the specification.

CHRISTOPHER H. LOVELL.